US011386451B1

(12) United States Patent
Tulloch et al.

(10) Patent No.: US 11,386,451 B1
(45) Date of Patent: Jul. 12, 2022

(54) DYNAMICALLY ALLOCATING COMPUTING RESOURCES TO IDENTIFY ADVERTISEMENTS FOR PRESENTATION

(71) Applicant: META PLATFORMS, INC., Menlo Park, CA (US)

(72) Inventors: Andrew John Tulloch, Cambridge (GB); Stuart Michael Bowers, Menlo Park, CA (US); Joaquin Ignacio Quinonero Candela, Mountain View, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 167 days.

(21) Appl. No.: 16/555,407

(22) Filed: Aug. 29, 2019

Related U.S. Application Data

(63) Continuation of application No. 14/160,342, filed on Jan. 21, 2014, now Pat. No. 10,438,235.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0247* (2013.01); *G06Q 30/0269* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,844,967 B2* | 11/2010 | Kelly | G06F 9/5061 |
| | | | 718/102 |
| 2005/0005012 A1 | 1/2005 | Odhner et al. | |
| 2010/0063877 A1 | 3/2010 | Soroca et al. | |
| 2010/0293049 A1 | 11/2010 | Maher et al. | |
| 2012/0041819 A1 | 2/2012 | Ramer et al. | |
| 2012/0066055 A1 | 3/2012 | Nomula | |
| 2012/0066057 A1 | 3/2012 | Ramer et al. | |
| 2012/0290373 A1 | 11/2012 | Ferzacca et al. | |
| 2012/0303447 A1 | 11/2012 | Hughes et al. | |
| 2014/0036792 A1* | 2/2014 | Li | H04L 41/0836 |
| | | | 370/329 |
| 2014/0325055 A1 | 10/2014 | Oh et al. | |

* cited by examiner

*Primary Examiner* — Meredith A Long

(57) ABSTRACT

An advertising system has limited computing resources to spend evaluating advertisements of advertisers to determine a "best" advertisement to serve to users of a social networking system. The computing resources are allocated (e.g., by varying the number of advertisements that are considered for presentation to a user) based on the neediness of the user and/or the advertiser on a per impression basis. The neediness of a user may be determined by grouping users into groups and determining a yield curve of expected revenue per computing resource used. Then, the revenue may be maximized across impression opportunities for multiple users. The neediness of an advertiser may be determined by biasing the selection of one advertiser's advertisements over another advertiser's advertisements based on an expected revenue, an expected number of interactions of the advertisement, or otherwise maximizing a satisfaction coefficient for the advertiser.

20 Claims, 4 Drawing Sheets

DYNAMICALLY ALLOCATING COMPUTING RESOURCES TO IDENTIFY ADVERTISEMENTS FOR PRESENTATION

CROSS REFERENCE TO RELATED APPLICATIONS

This application is a continuation of co-pending U.S. application Ser. No. 14/160,342, filed Jan. 21, 2014, which is incorporated by reference in its entirety.

BACKGROUND

This disclosure relates generally to advertising via social networking systems, and more specifically to allocating computing resources to evaluate or select advertisements.

A social networking system, or other suitable online system, allows its users to connect to and communicate with other social networking system users. Users may create profiles on a social networking system that are tied to their identities and include information about the users, such as interests and demographic information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users.

Presenting advertisements to social networking system users allows an advertiser to gain public attention for products or services, or to persuade online users to take an action regarding the advertiser's products or services. Additionally, many social networking systems generate revenue by displaying advertisements to their users. Frequently, social networking systems charge advertisers for each presentation of an advertisement to a social networking system user (e.g., each "impression" of the advertisement) or interaction with an advertisement by a social networking system user. A "better" advertisement has a better chance to generate revenue than a "worse" advertisement. However, conventional methods allocate, to each advertisement being evaluated, an equal amount or level of computing resources for finding an advertisement from a plurality of advertisements of an advertiser's advertisement campaign.

SUMMARY

A social networking system identifies impression opportunities for presenting advertisements from advertisers to users of the social networking system. An impression opportunity is an opportunity to present an advertisement to a user. Where there are multiple opportunities at a time to present advertisements to users, the social networking system can determine how to allocate the computing resources amongst finding advertisements for those users/impression opportunities. A yield curve is accessed for each of the users being presented with advertisements. Each yield curve of a user represents a group of users, each user in the group of users sharing an attribute with other users in the group (e.g., users in the U.S. or Brazil). An attribute of a user can be the user's residence, age, gender, interests, "likes," connections, or any information about the user or from the user's user profile. For example, "likes" are interactions by users expressing interest in a content item, comment, or other suitable interactable items in the social networking system. A yield curve representing a group of users indicates an expected revenue to be generated by presenting an advertisement to a user in the group per amount or level of computing resources used in evaluating advertisements to identify an advertisement to present. The expected revenue for a user can be a monetary amount that the social networking system expects to receive if the advertisement is displayed to the user. Based on the yield curves, an amount of computing resources to allocate for identifying an advertisement for each user is determined. The allocation is determined to maximize revenue across the identified impression opportunities for each user of the users of the social networking system and/or to increase the chance of finding an advertisement that is a better match for a user. For example, for impression opportunities for a number of users at a time, the system might determine which users are the "neediest" (e.g., the ones for whom the system would like to find the best advertisement match) or the most monetizable, and so the system might expend more computing resources finding the "best" ad for those users. The amount of computing resources allocated to each user, to identify an advertisement for presentation to the user, is applied to each user.

The accessed yield curve can also be a yield curve accessed for an advertiser. The yield curve of an advertiser indicates an expected revenue to be generated by presenting an advertisement of the advertiser per amount of computing resources used in evaluating advertisements of the advertiser to identify an advertisement for display. The expected revenue for an advertiser presenting an advertisement to a user can be a monetary amount that the advertiser expects to receive if the advertisement is displayed to the user.

Based on the yield curve of an advertiser, an amount of computing resources to allocate to the advertiser for evaluating advertisements of the advertiser is determined. The allocation can be based on expected revenue of presenting the advertiser's advertisement or slope of the yield curve of the advertiser for a specified expected revenue. Allocation can also be based on a satisfaction coefficient for the advertiser. A satisfaction coefficient for an advertiser can be a value representing positive events and negative events of the advertiser. A positive event can be an interaction that benefits the advertiser and a negative event can be an interaction that does not benefit the advertiser. In addition, allocation can be determined based on an expected number of interactions to receive from a user for advertisements in an advertisement campaign of an advertiser by spending a budget associated with the advertisement campaign of the advertiser. An interaction can be a positive event or a negative event. The amount of computing resources allocated to each advertiser, to evaluate advertisements in the advertisement campaign of the advertiser, is applied to each advertiser.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Architecture

Figure 1:
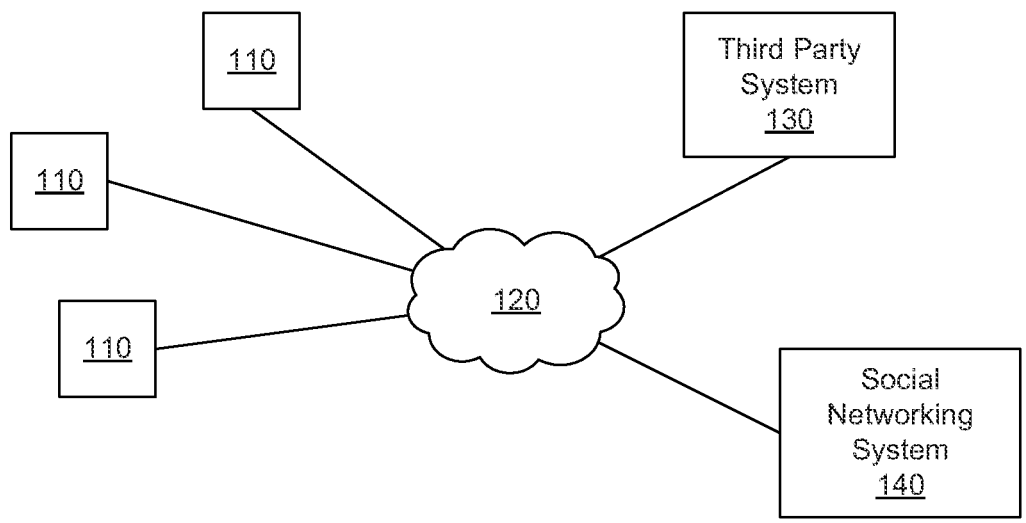
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
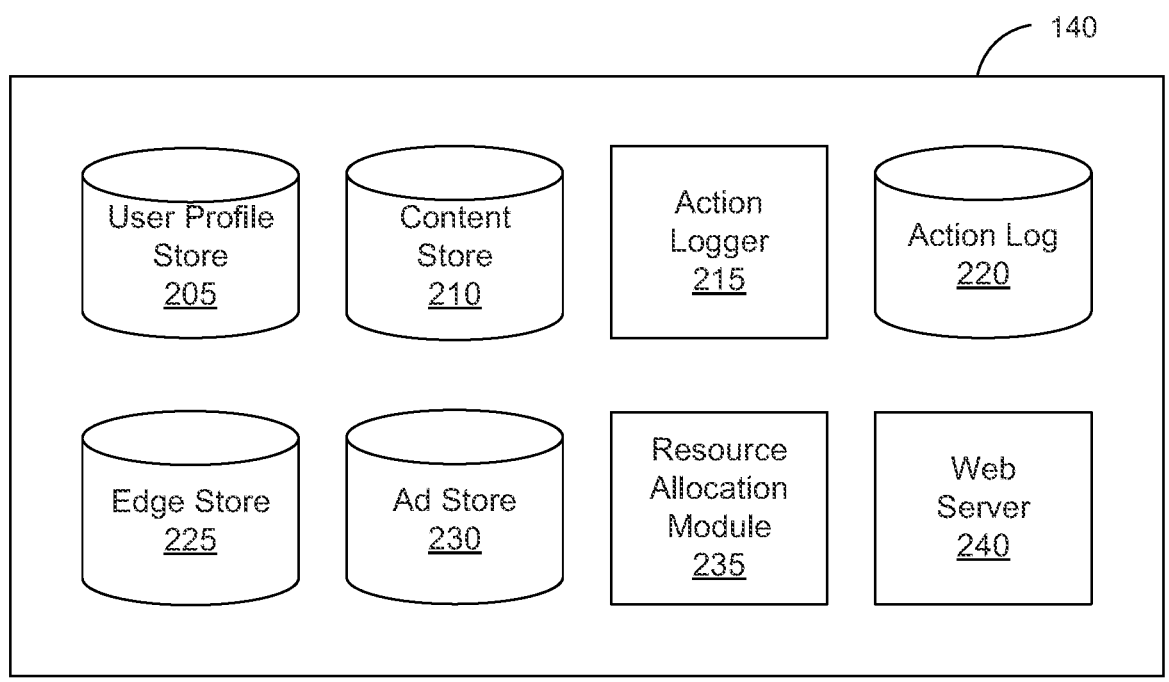
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an ad store 230, a resource allocation module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture. In various embodiments, the functionality described below may be adapted for use with online systems other than a social networking system 140.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

A user profile can also include or be associated with a yield curve associated with the user of the user profile. The yield curve of a user can be associated with a group and include information about expected revenue from presenting an advertisement to similar additional users per computing resources used to evaluate advertisements for presentation to the similar additional users. The additional users can be determined to be similar to the user based on information about the user from the user's user profile. In addition, the yield curve of a user can be any other suitable representation and can be generated by the resource allocation module 235 and stored in the user profile store 205.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement campaigns ("ad campaigns") are included in the ad store 230. An ad campaign includes one or more advertisements received from an advertiser for presentation to users of the social networking system 140. Each advertisement includes an advertisement content ("ad content"), which is content presented to a social networking system user, such as text data, image data, audio data, video data, or any other suitable data. An advertisement may also associate a destination address with an ad content to specify a source of content presented to a user that accesses the advertisement when it is presented. For example, the destination address identifies a landing page including content that is presented to the user when the user accesses the advertisement.

Additionally, advertisements, such as those in an ad campaign, are associated with a bid amount. The bid amount associated with an advertisement specifies an amount of compensation an advertiser provides the social networking system 140 for presenting the advertisement, for a user interacting with the advertisement, or for another suitable interaction with the advertisement. Based on the bid amount associated with an advertisement, the social networking system 140 determines an expected value to the social networking system for presenting the advertisement to a user. For example, the expected value is an amount of monetary compensation received by the social networking system 140 from an advertiser for presentation of the advertisement to a user, for a user interacting with the presented advertisement, or based on any other suitable condition. In one embodiment, the expected value is determined by multiplying the bid amount by a probability of the advertisement being accessed.

Additionally, advertisements, such as those in an ad campaign, may be associated with one or more targeting criteria. An advertiser may specify targeting criteria associated with an advertisement. Targeting criteria specify one or more characteristics of users eligible to be presented with an advertisement associated with the targeting criteria. Associating different targeting criteria with different advertisements in an ad campaign allows an advertiser to tailor presentation of advertisements to users having specific characteristics, allowing advertisements with different ad content to be presented to users with different characteristics. For example targeting criteria specify demographic information, connections, or actions associated with a user. In some embodiments, targeting criteria may be associated with the ad campaign in its entirety, so multiple advertisements in the ad campaign are associated with the targeting criteria.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identify users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine which users are eligible to be presented with advertisements from an ad campaign. As another example, targeting criteria identifies users having a connection to another user or object or having a particular type of connection to another user or object.

Additionally, the ad campaign may include an objective specifying a goal of the advertiser for presentation of advertisements in the ad campaign to social networking system users. For example, the objective identifies a type of interaction with advertisements included in the ad campaign or with one or more objects associated with advertisements in the ad campaign by social networking system users presented with an advertisement from the ad campaign. Examples of objectives include: social networking system users accessing a presented advertisement (e.g., clicking or otherwise accessing the advertisement), social networking system users installing an application associated with the advertisement, social networking system users expressing a preference for a page associated with the advertisement (e.g., "liking" the page), social networking system users viewing a page associated with the ad campaign, or any other suitable action by social networking system users. In one embodiment, the objective is selected from a set of objectives maintained by the social networking system 140.

In some embodiments, the ad campaign includes a performance metric describing a benefit to the advertiser for presenting advertisements included in the ad campaign. The performance metric is based on performance scores associated with various advertisements in the ad campaign. An advertisement's performance score describes an effectiveness of the advertisement in advancing an objective associated with the ad campaign or with the advertisement. A performance score of an advertisement may be a percentage of total interactions with the advertisement satisfying an objective associated with the advertisement or with an ad campaign including the advertisement, a number of interactions with the advertisement satisfying the objective associated with the advertisement of with the ad campaign including the advertisement, or any other suitable value. The performance score is further described in conjunction with FIG. 3. A performance metric of the ad campaign may also be based at least in part on bid amounts associated with advertisements in the ad campaign, a prior performance score of the ad campaign, or other suitable information. For example, the performance metric of the advertisement campaign increases as a performance score of an advertisement in the ad campaign increases based on user interaction with the advertisement. Similarly, the performance metric of the advertisement campaign decreases if a performance score of an advertisement in the advertisement campaign decreases based on a user presented with the advertisement hiding the advertisement, for example, or not interacting with the advertisement when it is presented.

Additional information may be included in the ad campaign. For example, the ad campaign includes a budget that specifies a total amount of compensation an advertiser provides the social networking system 140 for presenting advertisements included in the ad campaign. The budget may be allocated for the ad campaign as a whole or per advertisement. In addition, the advertiser may specify instructions for allocating the budget among the advertisements in the ad campaign. For example, the instructions specify modification of a bid amount associated with an advertisement included in the ad campaign. The instructions may also include other suitable information describing allocation of budget among advertisements included in the ad campaign.

An advertiser of an ad campaign can also be associated with a yield curve. The yield curve of the advertiser can represent expected revenue to be received by the advertiser per amount of computing resources used to evaluate advertisements of the advertiser to be presented to a user, a plurality of similar users, users in a group, or any combination thereof. The yield curve can also represent expected revenue to be received by the advertiser per amount or level of computing resources used to evaluate advertisements of the advertiser based on previous revenue gained by the advertiser for an advertisement in the advertiser's ad campaign, previous revenue gained by similar advertisers with similar advertisements, user interaction history of the advertiser's advertisements, user interaction history of the additional advertiser's similar advertisements, or any other suitable information associated with revenue of the advertisements of the advertiser.

When the social networking system 140 receives advertisements from advertisers, the resource allocation module 235 determines amount or level of computing resources to allocate to users of the social networking system 140 to find a "best" advertisement to serve a user or to allocate to advertisers to evaluate and select more advertisements of the advertiser's to find a "best" advertisement to present to a user. Embodiments of computing resources include computation time, computing machines with varying performance specifications, a number of computing machines, and any other suitable means of affecting computational performance. Evaluation and selection of advertisements can occur during a latency period, which begins when an impression opportunity is identified, as described further in FIGS. 3 and 4. Latency periods can include specific time intervals, such as late at night, other suitable times when there are less users using the social networking system 140 than usual, or other suitable time intervals when computing resources are available. While the quality of advertisements selected or identified for presentation generally increases as the number of advertisements evaluated by the social networking system 140 increases, the latency period also increases for evaluating the increased number of advertisements using limited computing resources of a social networking system 140 using periods of high user demand. Given the limited computing resources available, the resource allocation module 235 determines amount of computing resources to allocate to users or to advertisers based on yield curves associated with the users or yield curves associated with the advertisers, respectively. The resource allocation module 235 can access the yield curves of the users from the user profile store 205 or yield curves of advertisers from the ad store 230. In alternative embodiments, the resource allocation module 235 can generate a yield curve for a user based on information of the user in the user profile store 205, the action log 220, the edge store 225, or any other suitable information of the user based on the user's usage of the social networking system 140. The generated yield curve can be generated when needed for a new user and stored in the user profile store 205 along with an association with the user.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BLACKBERRYOS®.

Figure 3:
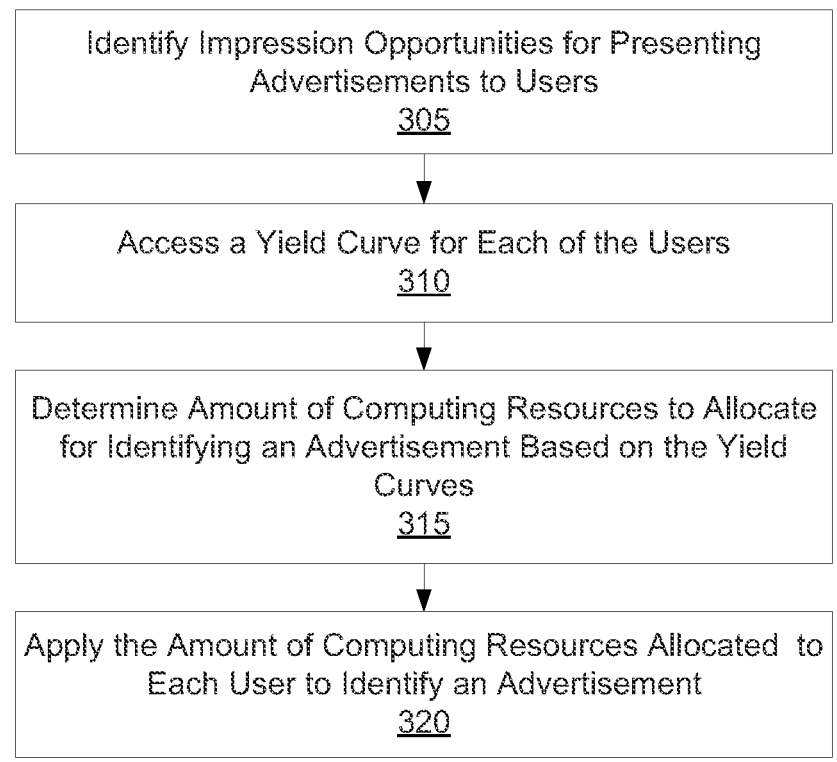
FIG. 3 is a flowchart of a method for adaptively allocating computing resources for advertisement evaluation based on yield curves associated with users, in accordance with an embodiment.

Allocating Computing Resources for Evaluation of Advertisements Based on Yield Curves Associated with Users FIG. 3 is a flow chart of one embodiment of a method for adaptively allocating computing resources for evaluating advertisements to determine a "best" advertisement to serve to a user of the social networking system 140 based on yield curves associated with users. In various embodiments, the steps described in conjunction with FIG. 3 may be performed in different orders. Additionally, in some embodiments, the method may include different and/or additional steps than those shown in FIG. 3. The functionality described in conjunction with the social networking system 140 in FIG. 3 may be provided by the resource allocation module 235, in one embodiment, or may be provided by any other suitable component, or components, in other embodiments. Additionally, the client device 110 may execute one or more instructions associated with the social networking system 140, such as an application associated with the social networking system 140, to provide the functionality described in conjunction with FIG. 3.

The social networking system 140 identifies 305 impression opportunities for presenting advertisements to users of the social networking system 140. An impression opportunity is an opportunity or availability to present an advertisement to a user. An impression opportunity can be identified when a user views all advertisements presented to the user 140, more than a threshold number of advertisements are stored in the ad store 230, a user logs in to the social networking system 140, a user refreshes a page in the social networking system 140, a user views a different page than a current page in the social networking system 140, or other suitable situations for when a user is available to view an advertisement occur. The advertisements can be from one or more advertisers, and an advertiser can have one or more advertisements in the advertiser's ad campaign. The ad store 230 can store the advertiser's ad campaigns including the advertisements.

A yield curve is accessed 310 for each of the users when there is an impression opportunity for that user. Each yield curve represents a group of one or more users, and the group of users can be formed based on an attribute shared by users in the group. An attribute of a user includes residence, age, gender, interests, "likes," connections, any information stored in a user profile of the user, or any other suitable description of or information associated with the user. For example, "likes" are interactions by users expressing interest in a content item, comment, or other suitable items in the social networking system that users can interact with. A yield curve representing the group of users indicates an expected revenue to be generated by presenting an advertisement to a user of the group per amount of computing resources used in evaluating advertisements to identify an advertisement to present.

The expected revenue for a user is a monetary amount that the social networking system 140 expects to receive or generate by presenting an advertisement to a user of the group per amount of computing resources used in selecting one or more advertisements for display to a user of the group of users. For example, the social networking system 140 can receive the monetary amount from an advertiser of the advertisement. The expected revenue can be determined based on actions of users in the group, previous revenue gained from presenting advertisements to users in the group, previous revenue gained from presenting advertisements to users associated with specified attributes based on the specified attributes of the users in the group, and other suitable situations when revenue was gained. Actions of a user include "liking" an advertisement, interacting with an advertisement, or any other suitable interaction with an advertisement from a user interaction history of the advertisement.

In other embodiments, the yield curve can be any type of function or equivalent representation that provides a measure of value of expected revenue for two or more different levels of computing resources. The two or more different levels of computing resources can be discrete levels or categories, where a category can be of an amount of computing resources to use. The two or more different levels of computing resources may be dynamic, based on real-time variables, or be more traditional values that may be plotted, as shown in an example in FIG. 5. In addition, the yield curve may be implemented as a set of rules or logic. For example, if a user is in or associated with a first group, assign a specified level of resources, a level of resources above a threshold level of resources to the user, or increase a level of resources by a specified level or to a specified level. If the user is in or associated with a second group, assign a specified level of resources, a level of resources below a threshold level of resources to the user, or increase a level of resources by a specified level or to a specified level.

Similarly, the measure of expected value can be a monetary amount, as described previously, or may be a category of users. For example, measure of expected value can be a number or group of users expected to interact with the presented advertisement. The number or group of users expected to interact with the presented advertisement can be determined, for example, through the user's connections in the edge store 225. A yield curve of a user can be accessed 310 from the user profile store 205 and is stored with an association with the user.

Based on the yield curves, an amount of computing resources to allocate for identifying an advertisement for each user is determined 315. The allocation is determined 315 to maximize revenue across the identified impression opportunities for the users. For example, if the social networking system 140 can expect that additional resources assigned for a first user relative to assigning the same additional resources for a second user would result in at least a threshold increase in expected revenue for the first user relative to the second user, then the additional resources can be assigned to the first user.

Figure 5:
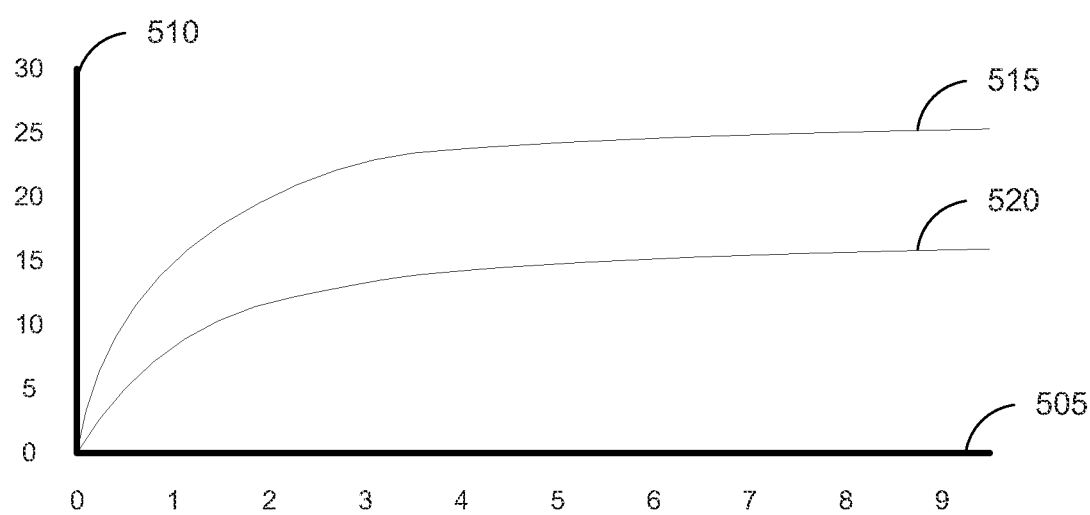
FIG. 5 is an example of yield curves associated with users, in accordance with an embodiment.

In one embodiment, the allocation is determined 315 based on neediness of a user. Neediness of a user can be determined based on the yield curves and, specifically, slopes of the yield curves at specified amounts of computing resources. A yield curve comprises a slope which represents expected revenue per amount of computing resource and decreases over time, as shown in FIG. 5. If the slope of a yield curve accessed for a user is high, then allocating more computing resources is likely to result in a higher return in revenue due to finding a better advertisement to present to the user. If the slope is low, then allocating more computing resources is less likely to result in a higher return in revenue. The slope can be determined to be high if the slope is higher than a threshold maximum slope for a specified expected revenue or a specified amount of computing resources and low if lower than a threshold minimum slope for a specified expected revenue or a specified amount of computing resources. If the slope is higher than the threshold maximum slope for a specified expected revenue or a specified amount of computing resources, then more computing resources are allocated to identifying an advertisement for the user. If the slope is lower than the threshold minimum slope for a specified expected revenue or a specified amount of computing resources, less computing resources are allocated to identifying an advertisement for the user. The amount of computing resources allocated to each user, to identify an advertisement for presentation to the user, is applied 320 to each user. Amount of computing resources allocated to one user may or may not equal the same amount of computing resources allocated to another user.

Figure 4:
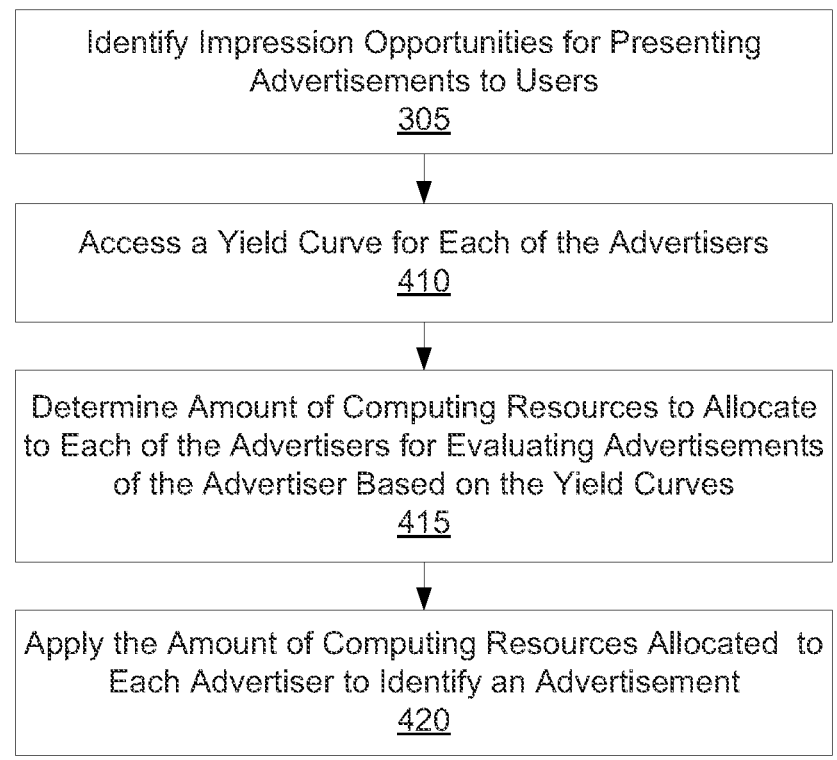
FIG. 4 is a flowchart of a method for adaptively allocating computing resources for advertisement evaluation based on yield curves associated with advertisers, in accordance with an embodiment.

Allocating Computing Resources for Evaluation of Advertisements Based on Yield Curves Associated with Advertisers FIG. 4 is a flow chart of one embodiment of a method for adaptively allocating computing resources for evaluating advertisements to determine a "best" advertisement to serve to a user of the social networking system 140 based on yield curves associated with the advertiser. In various embodiments, the steps described in conjunction with FIG. 4 may be performed in different orders. Additionally, in some embodiments, the method may include different and/or additional steps than those shown in FIG. 4. The functionality described in conjunction with the social networking system 140 in FIG. 4 may be provided by the resource allocation module 235, in one embodiment, or may be provided by any other suitable component, or components, in other embodiments. Additionally, the client device 110 may execute one or more instructions associated with the social networking system 140, such as an application associated with the social networking system 140, to provide the functionality described in conjunction with FIG. 4.

The social networking system 140 identifies 305 a plurality of impression opportunities for presenting advertisements of advertisers to users of the social networking system 140 where the advertisements can be from one or more advertisers, and an advertiser can have one or more advertisements in the advertiser's ad campaign, as described in conjunction with FIGS. 2 and 3. The advertiser's ad campaigns including the advertisements can be stored in the ad store 230.

A yield curve is accessed 410 for each of the advertisers. Each yield curve for an advertiser represents a group of one or more similar advertisers or advertisements of the advertiser, and the group can be formed based on an attribute shared by the one or more similar advertisers or advertisements of the advertiser in the group. An attribute of a similar advertiser includes information of advertisements of the similar advertiser, user interaction history of advertisements of the similar advertiser, or any other suitable information associated with the similar advertiser's ad campaign of advertisements. An attribute of an advertisement of the advertiser includes targeting criteria associated with the advertisement, user interaction history of the advertisement, or any other suitable information associated with the advertisement of the advertiser. Each yield curve indicates an expected revenue to be generated by presenting an advertisement of an advertiser per amount of computing resources used in evaluating advertisements of the advertiser to identify an advertisement for display.

The expected revenue for an advertiser presenting an advertisement to a user is a monetary amount that the advertiser expects to receive if the advertisement is displayed to the user. For example, the advertiser can receive the monetary amount from a user interacting with the advertiser's advertisement. The expected revenue from displaying an advertiser's advertisements can be determined based on previous user interactions with additional advertisements similar to the advertiser's advertisements, previous user interactions with the advertiser's advertisements, previous revenue from additional advertisements similar to the advertiser's advertisements, previous revenue from the advertiser's advertisements, previous revenue from additional advertisements presented to the user, and other suitable interactions with the advertiser's advertisements or the advertisement.

In other embodiments, the yield curve can be any type of function or equivalent representation that provides a measure of value of expected revenue for two or more different levels of computing resources. The two or more different levels of computing resources can be discrete levels or categories, where a category can be of an amount of computing resources to use. The two or more different levels of computing resources may be dynamic, based on real-time variables, or be more traditional values that may be plotted, as shown in an example in FIG. 5. In addition, the yield curve may be implemented as a set of rules or logic. For example, if an advertiser is in or associated with a first group, assign a level of resources above a threshold level of resources to the advertiser or increase the level of resources by a specified level or to a specified level. If the advertiser is in or associated with a second group, assign a level of resources below a threshold level of resources to the user or increase the level of resources by a specified level or to a specified level.

Similarly, the measure of expected value can be a monetary amount, as described previously, or may be a category of users. For example, measure of expected value can be a number of users expected to interact with the presented advertisement. The number of users expected to interact with the presented advertisement can be determined, for example, through the connections of a user being presented the advertisement in the edge store 225. A yield curve of an advertiser can be accessed 410 from the ad store 230 and is stored with an association with the advertiser.

Expected revenue can also be based on computing resources used in evaluating advertisements for a user. For example, allocating more computing resources results in more advertisements of an advertiser being evaluated, thus, an increased chance for finding a better advertisement for the user with a final revenue that may be higher than an expected revenue for displaying the better advertisement to a user. To determine for which advertiser to allocate more computing resources, the expected revenue based on yield curves for an advertiser is accessed 410.

Based on the yield curves, an amount of computing resources to allocate to each of the advertisers for evaluating advertisements of the advertiser for display to a user is determined 415. The allocation is determined 415 to bias selection of an advertisement of one advertiser over selection of an advertisement of another advertiser based on an expected return on investment (ROI) for each advertiser. For example, an advertisement of one advertiser would be biased over selection of an advertisement of another advertiser if the advertisement of the one advertiser has an expected return that is higher than an expected return of the advertisement of another advertiser. Thus, in this example, the amount of computing resources allocated to the one advertiser would be higher than the amount of computing resources allocated to another advertiser.

Amount of computing resources to allocate to the one advertiser being biased over the another advertiser can be based on a slope of a yield curve for a specified expected revenue or a specified amount of computing resources associated with the one advertiser. For example, if the slope of the yield curve associated with the one advertiser is more than a threshold maximum slope for a specified expected revenue or a specified amount of computing resources, then more computing resources are allocated to evaluate advertisements of the one advertiser. If the slope of the yield curve is less than a threshold minimum slope for a specified expected revenue or a specified amount of computing resources, then less computing resources are allocated to evaluate the advertisements of the one advertiser.

The allocation can also be determined 415 based on maximizing a satisfaction coefficient for each advertiser. A satisfaction coefficient for an advertiser is a value representing positive events and negative events of the advertiser's one or more advertisements. A positive event can be an advertiser presenting an advertisement from the advertiser's ad campaign to a user, the advertiser's advertisement being selected to be presented to a user, a user interacting with the advertiser's presented advertisement, or any other suitable positive interaction that benefits the advertiser. A negative event can be an advertiser's advertisement not being selected to be presented to a user, a user not interacting with the advertiser's presented advertisement, or any other suitable negative interaction that does not benefit the advertiser. For example, the satisfaction coefficient of an advertiser can be a ratio based on a number of positive events, a number of negative events, a total number of events, or any combination thereof. In one example, the ratio can be the number of positive events to the total number of events associated with the advertiser.

The allocation can also be determined 415 based on a satisfaction coefficient of an advertiser and user interaction metric. The user interaction metric can be a measurement based on user-interaction history of one or more advertisements presented to the user, a time duration of the user interacting with one or more presented advertisements, or any other suitable information associated with user interaction with advertisements of the user. For example, the user interaction metric can be a measurement in a range, such as 0 to 1, where 0 represents unhappiness and 1 represents happiness. The allocation can be determined by a difference in satisfaction coefficient and the user interaction metric. If the difference exceeds a threshold difference, amount of computing resources allocated increases. If the difference does not exceed a threshold difference, amount of computing resources allocated decreases.

The allocation can also be determined 415 based on an expected number of interactions to receive from a user for advertisements in an ad campaign of an advertiser by spending a budget associated with the ad campaign of the advertiser. The interaction can be positive interactions, a total number of interactions, or any combination thereof. For example, if an advertiser expects to receive a specified number of interactions (e.g., 1000 interactions) with the advertisements in the advertiser's ad campaign for a specified budget (e.g., $10,000), the amount of computing resources allocated to the advertiser can increase if the remaining budget is less than a threshold difference from the specified budget and the specified number of interactions is not less than a threshold difference from the specified number of interactions, if the number of interactions is less than a threshold difference from the specified number of interactions and the remaining budget is not less than a threshold difference from the specified number of interactions, or any other suitable situation where there are more than a threshold number of interactions or a threshold remaining budget for the specified number of interactions or the specified budget, respectively. For example, if an advertiser has a specified budget of $10,000 and a specified number of interactions 1000, the amount of computing resources for the advertiser may increase if the remaining budget is less than a threshold difference, such as $1,000, from the specified budget but the number of interactions is more than a threshold difference, such as 250 interactions, from the specified number of interactions. The threshold difference for the specified budget and the specified number of interactions can be specified by the advertiser and stored in the ad store 230.

The allocation can also be determined 415 based on a slope of a yield curve of an advertiser at a specified expected return. In one embodiment, slope of a yield curve indicates expected revenue for the advertiser per computing resources used for evaluating advertisements of the advertiser. If the slope at a specified expected revenue for the advertiser is greater than a threshold slope, then amount of computing resources allocated to the advertiser can be increased because a slope greater than the threshold slope indicates that the expected return will quickly increase for a small amount of allocated computing resources. If the slope at the specified expected revenue is less than the threshold slope, then amount of computing resources allocated to the advertiser can be decreased or not changed because a slope less than the threshold slope indicates that the expected return will not quickly increase for a small amount of allocated computing resources. The amount of computing resources allocated to each advertiser to identify an advertisement of the advertiser for presentation to each user is applied 420. Amount of computing resources allocated to one advertiser may or may not equal the same amount of computing resources allocated to another advertiser.

In one embodiment, an effect of varying amount of computing resources allocated to a user or to an advertiser affects how many advertisements are considered for the user or by the advertiser. For example, an increased amount of computing resources can result in 2000 advertisements being evaluated instead of 1000 advertisements for the user or by the advertiser for a user. In this embodiment, selection of the advertisements, also referred to as an auction process, that are evaluated is not based on or affected, also, by the amount of computing resources allocated. In another embodiment, the selection can be based at least in part on the amount of computing resources allocated. The advertiser can choose to vary the weight of amount of computing resources allocated in the selection process from no weight to a heavier weight. The weight can be indicated by a value in a range, for example, from 0 to 100. These embodiments can also be applied in the method described in FIG. 3

FIG. 5 illustrates an embodiment of yield curves 500 associated with users of different groups. A yield curve represents expected revenue per amount of computing resources, represented as time for example, on the y-axis 510 and x-axis 505, respectively. Computing resources may include any of the embodiments as described in conjunction with FIG. 2. A first yield curve 515 represents a first user from a first group, such as a group of users residing in Brazil, and a second yield curve 520 represents a second user from a second group, such as a group of users residing in the United States. For a specified amount of computing resource, such as 2 s for when the x-axis represents time in seconds, slope of the first yield curve 515 is higher than slope of the second yield curve 520. Thus, spending 0.5 s more on the first user results in at least a threshold difference in expected revenue and spending 0.5 s less on the second user results in less than a threshold difference in expected revenue. Thus, 0.5 s is allocated from the second user to the first user.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:
accessing, at a social networking system, a yield curve for a viewing user at a client device, wherein the yield curve for the viewing user is a value function that:
represents a group of users that share at least one attribute;
is associated with potential server allocation resources; and
indicates an expected value to be generated by presenting an advertisement to the user at the client device per amount of server resources used to find an advertisement for presentation to the user at the client device;
automatically determining, using a processor and based on at least one slope represented in the yield curves, an amount of server resources to allocate for finding an advertisement for the viewing user at the client device, wherein the allocation amount is increased in the event the at least one slope represented in the yield curves greater than a maximum slope threshold or lesser than a minimum slope threshold, wherein the maximum slope threshold and minimum slope threshold is associated with an amount of expected value to the social networking system due to presenting the advertisement to the viewing user at the client device; and
allocating the determined amount of server resources at one or more computing systems of the social networking system to find the advertisement for presentation to the user at the client device.

2. The method of claim 1, wherein the viewing user is a user of a group of users that are associated with the yield curve, and wherein the group of users includes other users that share one or more attributes with the viewing user.

3. The method of claim 2, wherein an attribute comprises at least one of a residence, age, gender, interests, likes, connections, and information from a user profile of the viewing user.

4. The method of claim 1, wherein the expected value to be generated is an expected monetary amount that the social networking system receives from an advertiser of the presented advertisement for presenting the advertisement to the viewing user.

5. The method of claim 1, further comprising determining the amount of server resources to allocate is based on an expected return on investment of each advertiser associated with each advertisement.

6. The method of claim 5, wherein the expected value can be determined based on at least one of previous user interactions with additional advertisements similar to the presented advertisement, previous user interactions with additional advertisements similar to the advertiser's advertisements, previous user interactions with the advertiser's advertisements, previous value from additional advertisements similar to the advertiser's advertisements, previous value from the advertiser's advertisements, and previous value from additional advertisements presented to the user.

7. The method of claim 1, further comprising determining the amount of server resources to allocate is based on maximizing a satisfaction coefficient for each advertiser associated with each advertisement.

8. The method of claim 7, wherein the satisfaction coefficient comprises a value representing positive events and negative events for the presented advertisement.

9. The method of claim 8, wherein a positive event for an advertisement comprises at least one of the advertisement being presented to a user, the advertisement being selected to be presented to a user at the client device, and a user interacting with the advertisement.

10. The method of claim 8, wherein a negative event of an advertisement comprises at least one of the advertisement not being selected to be presented to a user at the client device, and a user not interacting with the advertisement.

11. The method of claim 1, further comprising determining the amount of server resources to allocate is based on an expected number of interactions received from users of the social networking system for advertisements in each advertiser's ad campaign.

12. The method of claim 11, wherein an interaction can be a positive event or a negative event for the presented advertisement.

13. The method of claim 1, wherein the amount of server resources to allocate is proportional to the slope of the yield curve for the viewing user at the client device.

14. The method of claim 1, wherein allocating the determined amount of server resources at one or more computing systems of the social networking system to find the advertisement further comprises evaluating a number of advertisements in proportion to the amount of server resources that are allocated.

15. A non-transitory computer readable storage medium storing instructions which, when executed by a processor, causes the processor to:
access, at a social networking system, a yield curve for a viewing user at a client device, wherein the yield curve for the viewing user is a value function that:
represents a group of users that share at least one attribute;
is associated with potential server allocation resources; and
indicates an expected value to be generated by presenting an advertisement to the user at the client device per amount of server resources used to find an advertisement for presentation to the user at a client device;
automatically determine, based on at least one slope represented in the yield curves, an amount of server resources to allocate for finding an advertisement for the viewing user at the client device, wherein the allocation amount is increased in the event the at least one slope represented in the yield curves greater than a maximum slope threshold or lesser than a minimum slope threshold, wherein the maximum slope threshold and minimum slope threshold is associated with an amount of expected value to the social networking system due to presenting the advertisement to the viewing user at the client device; and
allocate the determined amount of server resources at one or more computing systems of the social networking system to find the advertisement for presentation to the user at the client device.

16. The computer program product of claim 15, wherein the viewing user is a user of a group of users that are associated with the yield curve, and wherein the group of users includes other users that share one or more attributes with the viewing user.

17. The computer program product of claim 16, wherein an attribute comprises at least one of a residence, age, gender, interests, likes, connections, and information from a user profile of the viewing user.

18. The computer program product of claim 15, wherein the expected value to be generated is an expected monetary amount that the social networking system receives from an advertiser of the presented advertisement for presenting the advertisement to the viewing user.

19. A system, comprising:
a processor; and
a memory storing instructions which, when executed by the processor, causes the processor to:
  access, at an online system, a yield curve for a viewing user at a client device, wherein the yield curve for the viewing user is a value function that:
    represents a group of users that share at least one attribute;
    is associated with potential server allocation resources; and
    indicates an expected value to be generated by presenting an advertisement to the user at the client device per amount of server resources used to find an advertisement for presentation to the user at the client device;
  automatically determine, based on at least one slope represented in the yield curves, an amount of server resources to allocate for finding an advertisement for the viewing user at the client device, wherein the allocation amount is increased in the event the at least one slope represented in the yield curves greater than a maximum slope threshold or lesser than a minimum slope threshold, wherein the maximum slope threshold and minimum slope threshold is associated with an amount of expected value to the social networking system due to presenting the advertisement to the viewing user at the client device; and
  allocate the determined amount of server resources at one or more computing systems of the social networking system to find the advertisement for presentation to the user at the client device.

20. The system of claim 19, wherein the viewing user is a user of a group of users that are associated with the yield curve, and wherein the group of users includes other users that share one or more attributes with the viewing user.

* * * * *